United States Patent [19]

Destree

[11] 4,054,179
[45] Oct. 18, 1977

[54] STONE AND CONCRETE CUTTING MACHINE

[76] Inventor: Allen L. Destree, 15728 Sunset Road, Bothell, Wash. 98011

[21] Appl. No.: 690,071

[22] Filed: May 26, 1976

[51] Int. Cl.² .............................................. E21C 9/00
[52] U.S. Cl. .................................... 173/32; 83/471.2; 125/14; 173/43; 266/71
[58] Field of Search ...................... 83/471.2, 485, 486, 83/488, 481, 508.2; 105/29 R, 29 TL; 125/13, 14; 173/32, 42–44; 299/15, 75; 266/67, 68, 71, 73

[56] References Cited

U.S. PATENT DOCUMENTS

| 3,148,001 | 9/1964 | Johnson | 299/75 |
| 3,323,507 | 6/1967 | Schuman | 125/14 |
| 3,360,298 | 12/1967 | Stoljarov et al. | 125/14 X |
| 3,378,307 | 4/1968 | Dempsey et al. | 125/14 X |
| 3,692,357 | 9/1972 | da Rocha et al. | 125/14 X |
| 3,722,497 | 3/1973 | Hiestand et al. | 125/14 |
| 3,763,845 | 10/1973 | Hiestand et al. | 125/14 |
| 3,989,211 | 11/1976 | Gundlach | 248/410 |
| Re. 28,121 | 8/1974 | Gulley | 173/32 |

FOREIGN PATENT DOCUMENTS

| 516,197 | 1/1931 | Germany | 83/508.2 |
| 505,692 | 12/1954 | Italy | 125/13 R |
| 1,028,128 | 5/1966 | United Kingdom | 83/471.2 |

Primary Examiner—Lawrence J. Staab
Attorney, Agent, or Firm—Wells, St. John & Roberts

[57] ABSTRACT

A stone and concrete cutting machine is described for performing cutting operations on stone or concrete surfaces. The machine includes an elongated base that is mountable to a stone or concrete surface through a bracket mechanism that is releasably received on the base. The base is comprised of one or more lengths of triangular cross-sectional tubing that provides rigid support for a truck mechanism movably mounted thereon. A number of rollers are rotatably mounted to a truck mechanism and engage three separate walls of the base to allow longitudinal movement of the truck mechanism along the length of the base. A hollow standard protrudes from the base to movably mount a cutting head carriage. A cutting head is mounted to the carriage through an adapter assembly that facilitates selective positioning of the cutting head on either of two sides of the standard. Drive mechanisms are provided that are concealed within the standard for moving the carriage and attached cutting head and for moving the truck along the base member.

11 Claims, 9 Drawing Figures

STONE AND CONCRETE CUTTING MACHINE

BACKGROUND OF THE INVENTION

The present invention relates to the field of cutting tools and more particularly to such tools utilized for cutting of stone and concrete, along such forms as wall and floor surfaces.

Development of circular saw blades having the capability of efficiently cutting stone and concrete has led to the development and utilization of equipment that will easily and quickly perform cutting opertions in floors and walls of concrete, marble, etc. where previously such projects could only be accomplished through use of conventional "jack hammers" or other related and substantially inconvenient tools.

One cutting device is disclosed in U.S. Pat. No. 3,378,307 granted to E. J. Dempsy et al on April 16, 1968. In this device, a rectangular rail is utilized to span a pair of stanchions which are secured to the working surface. A truck is movably mounted to the rectangular rail and completely encircles its cross-sectional periphery. A pair of standards protrude perpendicularly from this truck to provide sliding support for a cutting head carriage. The carriage is movably positioned on the upright standards by a manually operable crank. Movement of the truck along the rectangular rail is provided by a manually operable worm and worm gear arrangement. A pinion connected to the worm gear engages teeth that are formed integrally within the rectangular rail. The truck, since it encircles the rectangular rail, will not move beyond the stanchions which extend from the rail to the working surface.

U.S. Pat. Nos. 3,323,507, and 3,396,713 both granted to A. Schuman on June 6, 1967 and Aug. 13, 1968 respectfully, disclose a concrete saw guide and cutting machine. The concrete saw guide is comprised of a series of interconnected tracks that are bolted directly to the surface to be cut. A rack is provided on one longitudinal side of the guide, and an elongated hold-down bar is provided on the remaining side. The guide is of substantial transverse dimension between the rack and the longitudinal guide in order to provide stability to the cutting machine movably mounted thereon. The cutting machine ifself is movably mounted to the guide through a wheel supported truck. Two upright standards protrude from the truck to slidably receive a cutting tool carriage. A crank mechanism is provided to move the carriage along the standards in order to adjust the depth of the cut. A fractional horsepower motor is provided on the truck for driving a pinion that is in meshing engagement with the rack. Operation of the motor, therefore, will cause corresponding movement of the truck cutting assembly along the length of the assembled guide members. Once the guide is rigidly mounted to the surface to be cut, it may not be adjusted laterally. Nor is there any provision made by the cutting machine for locating the cutting blade in different positions on the carriage.

U.S. Pat. No. 1,671,872 granted to E. R. Palisted on May 29, 1928, discloses a stone cutting machine. This machine is designed to be mounted at a stationary location while the material (stone blocks) is brought to the machine. This machine is not capable of performing cutting operations on surfaces such as concrete walls or floors. The machine includes a longitudinal lead screw that moves a truck mechanism along a pair of longitudinal guide surfaces. A cutting tool is mounted to the truck member and is adjustable through a separate screw feeding mechanism to control the depth of cut. The longitudinal guides are held in stationary lateral position by opposed end posts that are ground supported. Any lateral movement of the mechanism relative to a cutting surface is made by moving the cutting surface rather than the cutting machine itself.

U.S. Pat. No. 2,502,043 granted to F. L. Howard on Mar. 28, 1950 discloses a cutting machine that is intended principally for concrete cutting purposes. This machine includes a pair of longitudinally spaced upright standards that support therebetween, a longitudinal guide tube. A truck is mounted to the tube that, in turn, mounts a cutting head with a pair of circular saw blades. The saw blades rotate in parallel planes and operate simultaneously in order to cut blocks or concrete samples from a wall or floor surface. The standards include paired lead screws that threadably engage a pinion. A worm at either end of a rod (that extends through the guide tube) rotates the respective pinions in order to move the guide tube toward or away from the cutting surface. Longitudinal movement of the cutting blades along the guide tube length is provided through a worm, worm wheel and rack and pinion arrangement. A longitudinal splined shaft is rotatably carried at the opposed ends of the guide tube. The splined shaft slidably carries a worm. Rotation of the splined shaft causes corresponding rotation of the worm which, in turn, is in meshing engagement with a worm wheel. The worm wheel is rotatably carried by the truck housing. The pinion is connected to the worm wheel and meshes with a rack that is affixed to an exterior surface of the guide tube. A crank at the end of the splined shaft is utilized to manually turn the shaft and cause corresponding longitudinal movement of the cutting blades along the guide tube.

U.S. Pat. No. 2,506,076 to L. I. Garrison granted May 2, 1950 discloses a stone cutting machine that is somewhat similar in structure to the Howard machine. However, Garrison utilizes a wheel assembly for guiding a truck longitudinally along angulated guide surfaces. The truck is moved longitudinally by an exposed, longitudinal lead screw that threadably engages a nut connected to the truck assembly. A cutting blade is operably connected to the truck and may be adjusted toward or away from a cutting surface by lead screws located at longitudinally spaced standards.

U.S. Pat. No. 3,011,530 to E. Lamb granted Dec. 5, 1961 discloses a guide for portable saw. Basically, this device is utilized in combination with a portable circular saw for trimming uneven wood building siding. The guide is comprised of a number of releasably connected channels. The channels receive rollers, which are carried by the base plate of a hand-held circular saw. The guide channel may be affixed to the construction adjacent to a desired trimline. This tube will then guide the saw blade as it is moved by an operator from one end of the cut to the remaining end.

U.S. Pat. No. 3,148,001 granted to B. E. Johnson on Sept. 8, 1964 discloses a mobile power actuated concrete saw with reaction supporting means therefore. This mechanism is utilized primarily for wall cutting purposes and includes a standard that is wedged between a floor and ceiling. It is adjustable, through a plate adapter mechanism, to perform horizontal as well as vertical cuts. This adjustment is provided by way of a first plate that is mounted to a truck on the upright standard and a second plate that is movably secured thereto. The second plate, when loosened from engagement with the first plate, allows rotation of a cutting mechanism (operatively connected to the second plate) to relatively any selected angle about a horizontal axis. The mechanisms for moving the cutting assembly laterally or horizontally are similar to apparatus disclosed above.

Another adjustable cutting tool head is disclosed in the U.S. Pat. No. 3,289,662 to L. I. Garrison issued Dec. 6, 1966. This patent discloses a dual head sawing machine wherein two separate sawing heads are mounted to a single longitudinal support. Each head is independently adjustable to set a cutting angle for its attached saw blade. This adjustment is provided by plate and clamp mechanisms that allow rotation of the cutting heads about fixed axes. The cutting heads are longitudinally movable as directed by angular guides positioned on either opposite ends of the cutting tool carriage. A rack and pinion assembly is utilized to move the cutting heads in a longitudinal direction along the opposed parallel guides.

The first object of the present invention is to provide a stone and concrete cutting machine wherein a mechanism is provided to enable extremely accurate cutting through a concrete or stone surface by enabling lateral adjustment of a base guide, and by providing secure yet movable mounting arrangements for a cutting tool on the longitudinal guide base.

A further object is to provide such a machine wherein the driving components are enclosed and therefore protected against the extremely abrasive dust normally produced during concrete and stone cutting operations.

A still further object is to provide such a machine wherein a cutting member may be positioned in several secure locations relative to the guide base.

A still further object is to provide such a machine that includes a truck movably mounted to the base that is capable of movement over the entire base length while the base is rigidly mounted to a cutting surface.

A still further object is to provide a base unit for the present mechanism that may be assembled in separate units to enable extension thereof to a desired length.

These and still further objects and advantages will become apparent upon reading the following detailed description which, taken with the accompanying drawings, disclose a preferred form of the present invention. It is not intended, however, that the following description or attached drawings be taken as limitations upon the scope of my invention. Such limitations are defined only by the claims attached at the end of this application.

BRIEF DESCRIPTION OF THE DRAWINGS

A preferred form of the present invention is illustrated in the accompanying drawings in which.

DETAILED DESCRIPTION OF A PREFERRED EMBODIMENT

Figure 1:
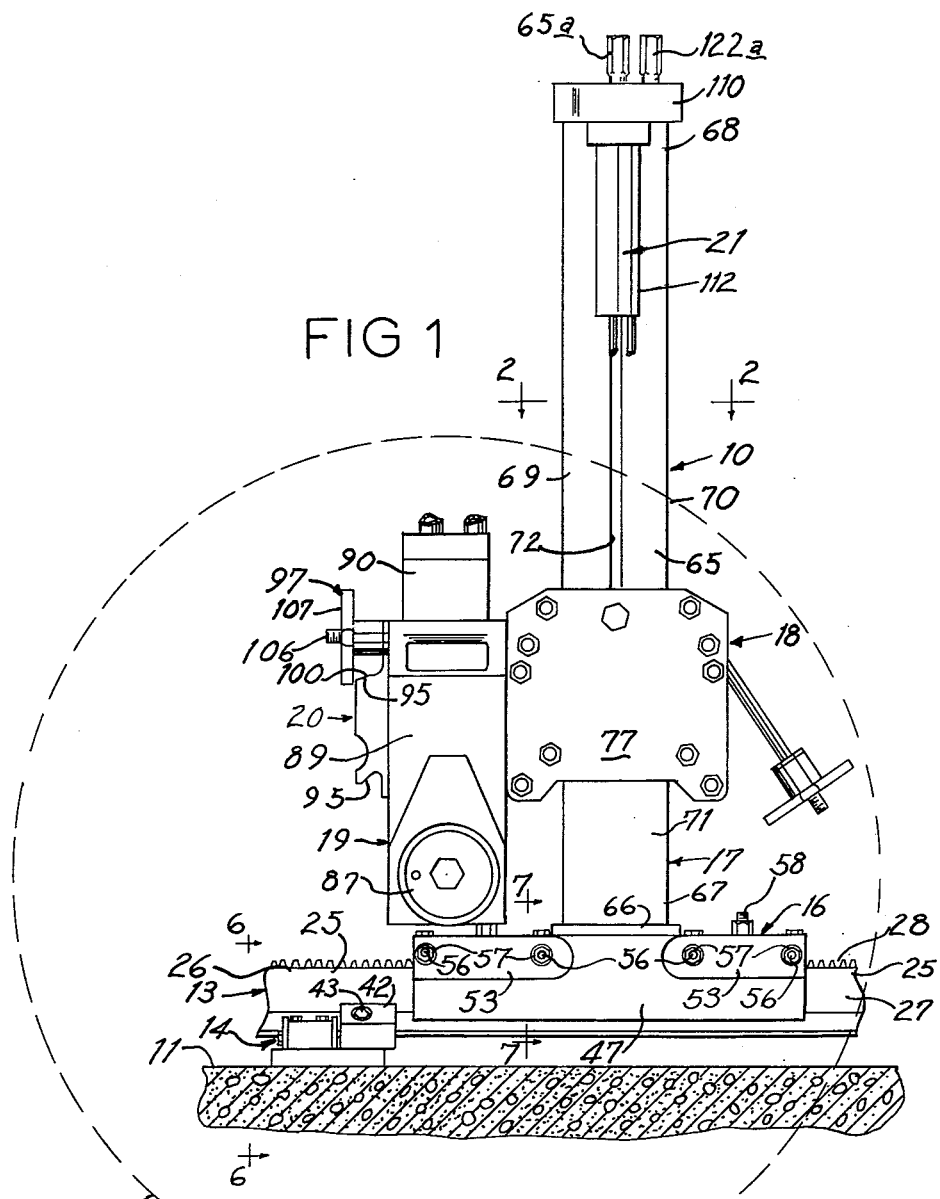
FIG. 1 is a side elevational view of the present invention in position adjacent a cutting surface.

A machine embodying a preferred form of the present invention is illustrated in the accompanying drawings and is designated therein by the reference character 10. It is intended that the machine 10 be utilized for cutting highly resistant surfaces such as stone or concrete and particularly walls or horizontal surfaces made of such material.

The device basically includes an elongted base 13 that is fixed to a wall or floor surface 11 by means of two or more brackets 14. A truck means 16 is mounted on the base for longitudinal movement along the base length. A standard 17 protrudes outwardly from the truck means 16 in perpendicular relation to the base 13 and wall or floor surface 11. A carriage 18 is mounted to the standard 13 for movement along its length. The carriage is designed to receive a cutting head such as a circular saw through an adapter means 20. The adapter means 20 is comprised of elements within both the cutting head 19 and carriage 18. Drive means 21 and 22 are provided for moving the truck means 16 and carriage 18 respectively along the base 13 and standard 17.

Figure 6:
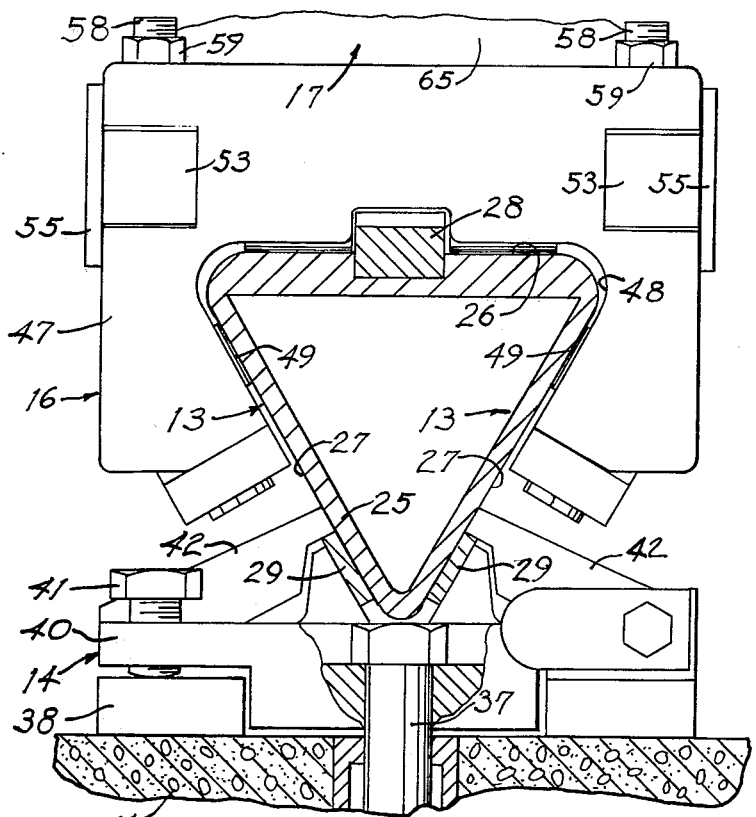
FIG. 6 is a sectional view taken along line 6—6 in FIG. 1.
Figure 7:
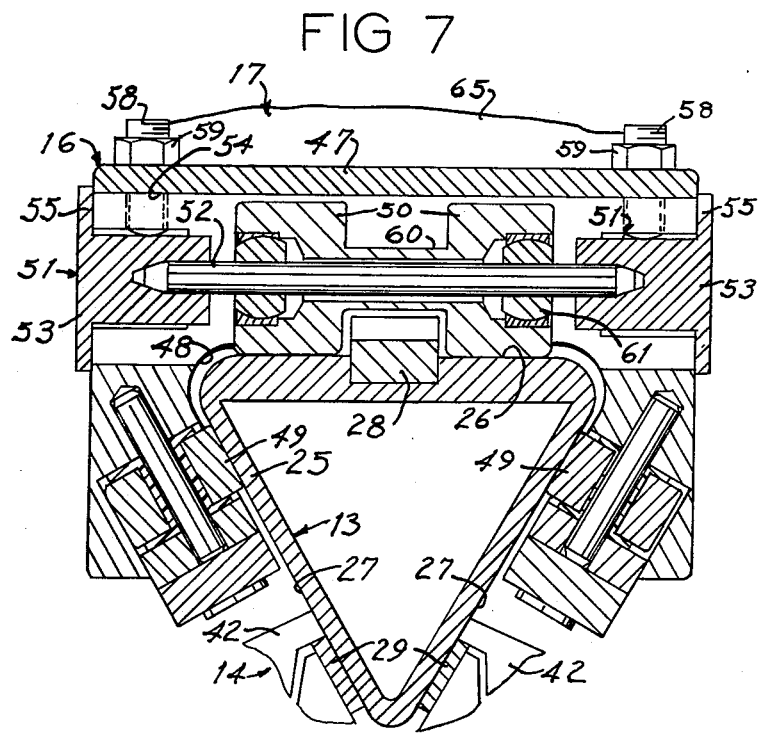
FIG. 7 is a sectional view taken along line 7—7 in FIG. 1.
Figure 8:
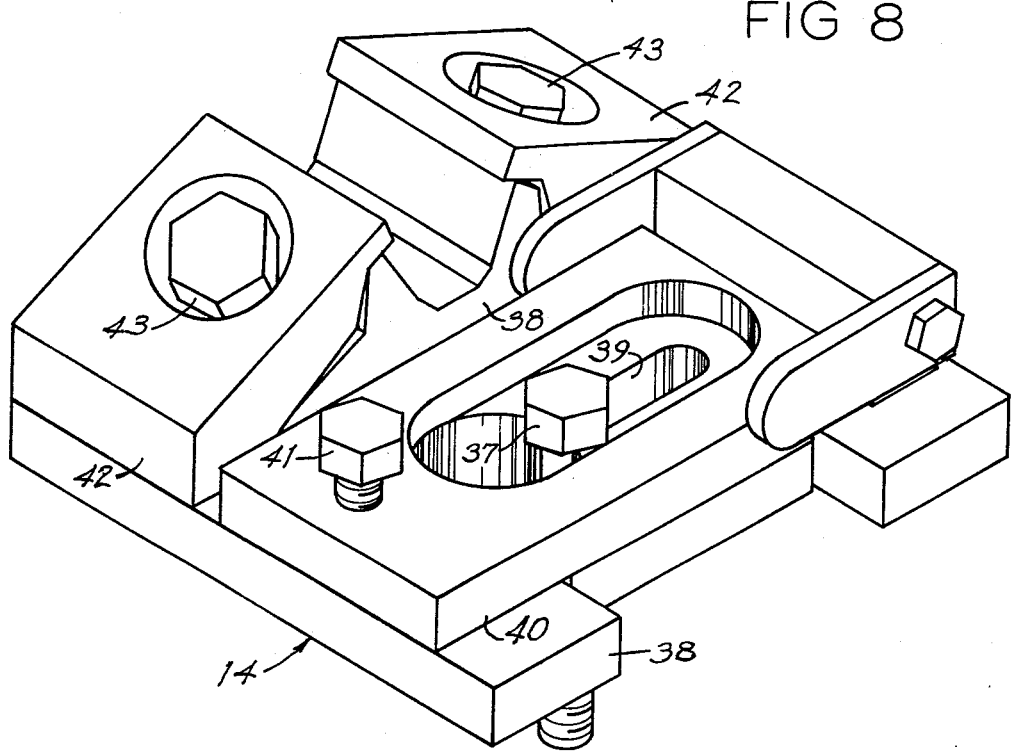
FIG. 8 is a detail view of a mounting bracket for the base of my invention.
Figure 9:
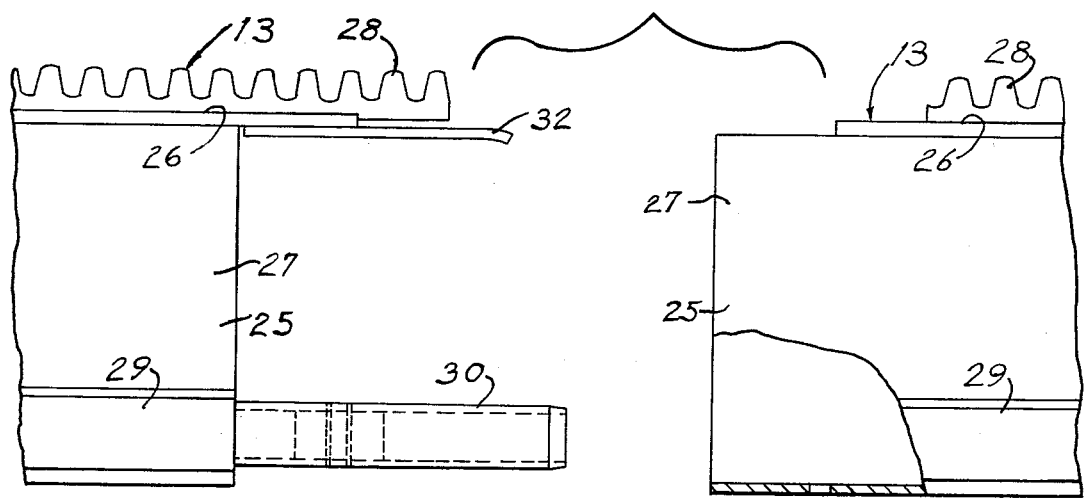
FIG. 9 is an exploded fragmentary view showing the mating relationship of opposed ends of individual base members of my invention.

The base is shown in detail by FIGS. 6, 7, and 9. Base 13 is comprised of one or more lengths of triangular tube sections 25. As shown, the base is triangular in cross section, having a substantially horizontal top surface 26 and converging sides 27. An elongated rack 28 extends the full length of the base on surface 26. A mounting strap 29 is provided along each of the converging sides 27 of the base 13. These mounting straps 29 provide surfaces on which the brackets 14 are attached to base 13.

The individual tube sections 25 may be interconnected by joining male connectors 30 (FIG.9) and female connectors 31 of adjacent tube sections. Each tube section includes a protruding pin 30 that nests in the "V" bottom of the mating part of a successive section. A bolt may be secured through one section into the pin 30 of the other section to positively lock the sections together.

Guide prongs 32 are provided at ends of tube sections 25. The guide prongs lie directly below the top surface 26. Thus, when fitted together the individual tube sections 25 form the continuous elongated base 13. Base 13 may be constructed of a desired number of tube sections 25 (which may vary in length) to relatively any desired base length in a straight line.

A base mounting bracket 14 is shown in detail by FIG. 6. Each bracket 14 is connected to an appropriate surface 11 by an anchor bolt 37 of conventional form. The brackets 14 each include a bracket base 38 that is designed to receive the converging sides 27 of base 13. Bolt 37 is received in a slot 39 that is formed through a pivoted arm portion 40 of base 38. The pivoted arm 40 is adjustably positioned by a release bolt 41 to enable lateral positioning of the bracket laterally adjacent to a desired path of movement for truck means 16.

Clamp plates 42 are provided on opposite sides of the base 38 to engage and clamp the mounting straps 29 downwardly into the complementary portion of base 38. Clamp bolts 43 are provided to tighten or release the grip of plates 42 against the straps 29. The base may therefore be easily moved longitudinally or be completely removed from the brackets.

A bracket 14 is mounted to surface 11 by first locating and drilling a pilot hole and inserting a conventional expanding anchor for the anchor bolt 37. A bracket may then be slipped over the bolt and positioned against the wall or floor surface. If the desired precise location of the bracket is immediately obtained, The release bolt 41 is turned to wedge the pivot arm 40 against the anchor bolt head and thereby firmly secure the bracket against surface 11. However, if the bolt is inadvertently placed at a position lateral of a desired base location, the release bolt 41 may be turned to relax the gripping force of arm 40 against anchor bolt 38 and enable lateral sliding movement of the bracket along the length of slot 39. Once the bracket is in position, the release bolt 41 may again be turned to tighten the pivot arm 40 against the anchor bolt head to secure the bracket in place.

When the bracket is in place, a tube section 25 may be placed within the complementary recess formed through the bracket base. Clamp plates 42 are then tightened by bolts 43 to firmly secure base section to the surface 11. The precisely located base defines a longitudinal path of travel for truck means 16.

Truck means 16 is basically comprised of a housing 47 that includes a longitudinally open channel 48 of complementary cross-sectional configuration to the triangular tube sections 25. It should be noted that the bottom or inside portion of the housing 47 is open along the housing length. Therefore, the housing 47 does not completely encircle the base cross section and is clear of the brackets 14. This provision enables free movement of the truck means 16 over the brackets 14 and along the full base length.

Truck means 16 is movably mounted to the base by sets of rollers 49 that engage the tube sides 27 and rollers 50 that engage the top surface 26. The roller sets 49 and 50 are situated at opposite longitudinal ends of the housing 47 to provide longitudinal stability to the housing on base 13.

The rollers 50 are urged downwardly against surface 26 by a biasing means 51. Biasing means 51 functions to pull the rollers 49 upwardly against the converging base sides 27 to firmly secure the housing 47 to base 13 while enabling longitudinal movement thereon.

The biasing means 51 includes a spring axle 52 for each roller 50. The axles 52 are journaled at their ends by end caps 53. Over-sized recesses 54 are provided in housing 47 to loosely receive the end caps 53. Each cap includes an extended lip 55 that abuts an outer surface of housing 47. Mounting bolts 56 (FIG. 1) extend through over-sized apertures 57 within the caps 53 to secure the caps to housing 47. Adjusting set screws 58 are provided along a top surface of the housing and extend therethrough to engage the caps 53.

The adjusting set screws 58 are utilized to force the caps 53 downwardly within the over-sized recesses 54. This downward pressure is transmitted to the spring axles 52 which, in turn, push downwardly against the rollers 50. Lock nuts 59 are provided on set screws 58 to secure them in position.

Each roller 50 includes an indented center portion 60 that allows clearance for the rack 28. Rollers 50 are rotatably mounted to spring axles 52 by appropriate bushings 61.

The standard 17 as shown is hollow in configuration and is comprised of a rectangular channel 65. The channel is rigidly connected to the truck housing 47 by channel base plate 66 at a lower channel end 67. The standard 17 extends in substantially perpendicular relationship to the base 13 and surface 11 to a free upper end 68. Standard 17 includes a forward side 69 facing the length of base 13 in one direction while a rearward side 70 faces the base length in an opposite direction. Longitudinal sides 71 of standard 17 connect the forward and rearward sides 69 and 70. An elongated slot 72 is formed in one of the longitudinal sides 71.

Carriage 18 is simply comprised of a pair of plates 77 situated on the opposite longitudinal sides 71 of standard 17. Plates 77 are held apart by spacer bars 78 and are movably mounted by rollers 79 to standard 17. There are four rollers 79 on each plate 77 so that four rollers engage the forward standard side 69 and the remaining four engage the standard side 70. Pairs of the rollers may be adjusted against the standard to provide a secure fit between the rollers and standard sides 69 and 70. The rollers are spaced apart along the standard length to prevent wobbling of the carriage on the standard when the machine is in operation.

Figure 2:
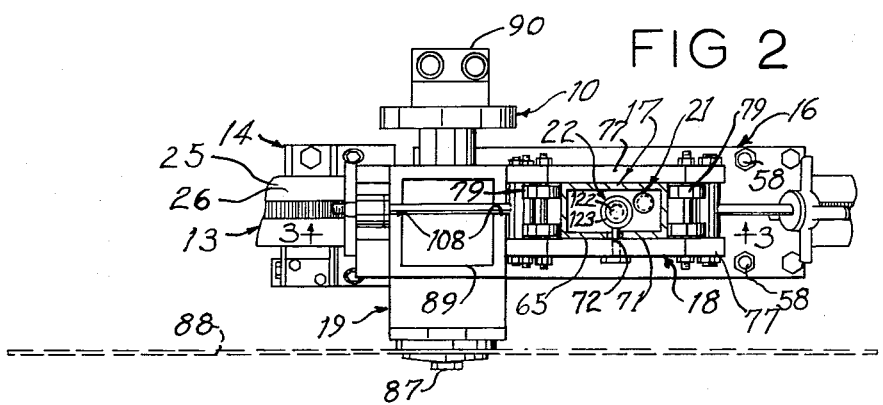
FIG. 2 is a sectional view taken along line 2—2 in FIG. 1.
Figure 3:
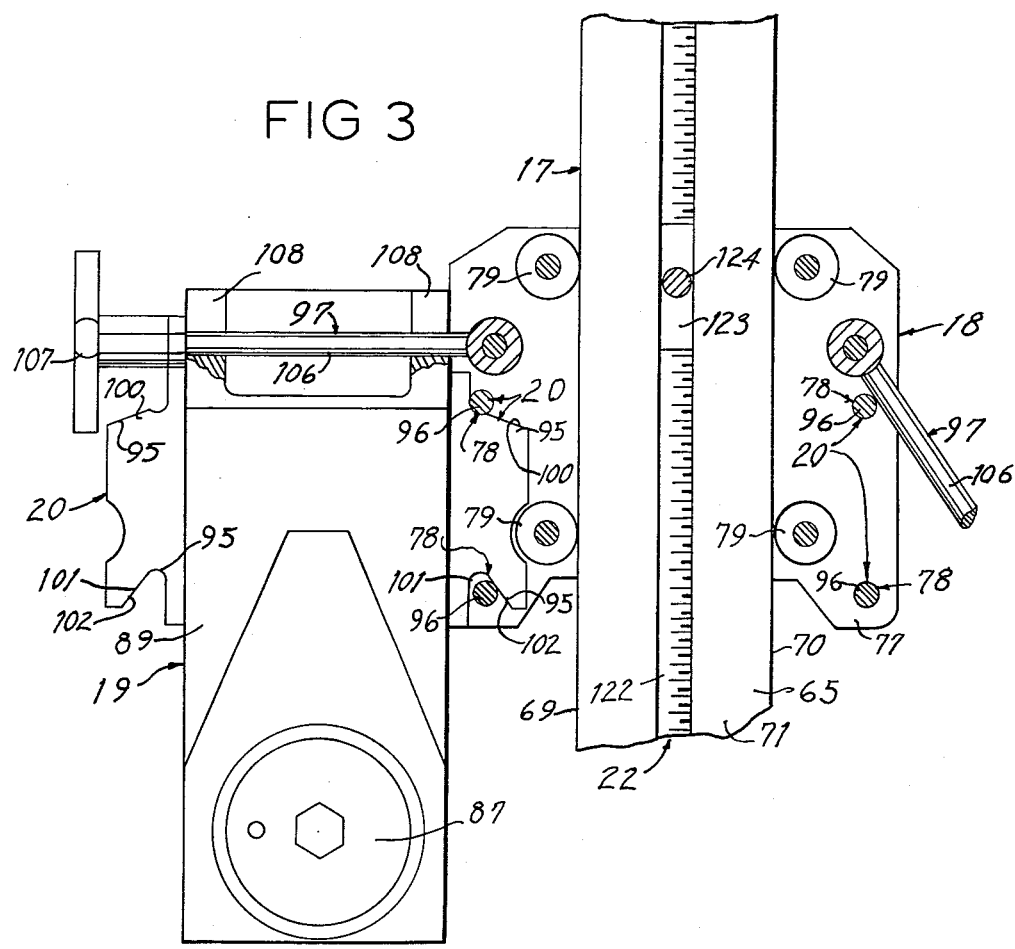
FIG. 3 is an enlarged sectional view taken along line 3—3 in FIG. 2.
Figure 4:
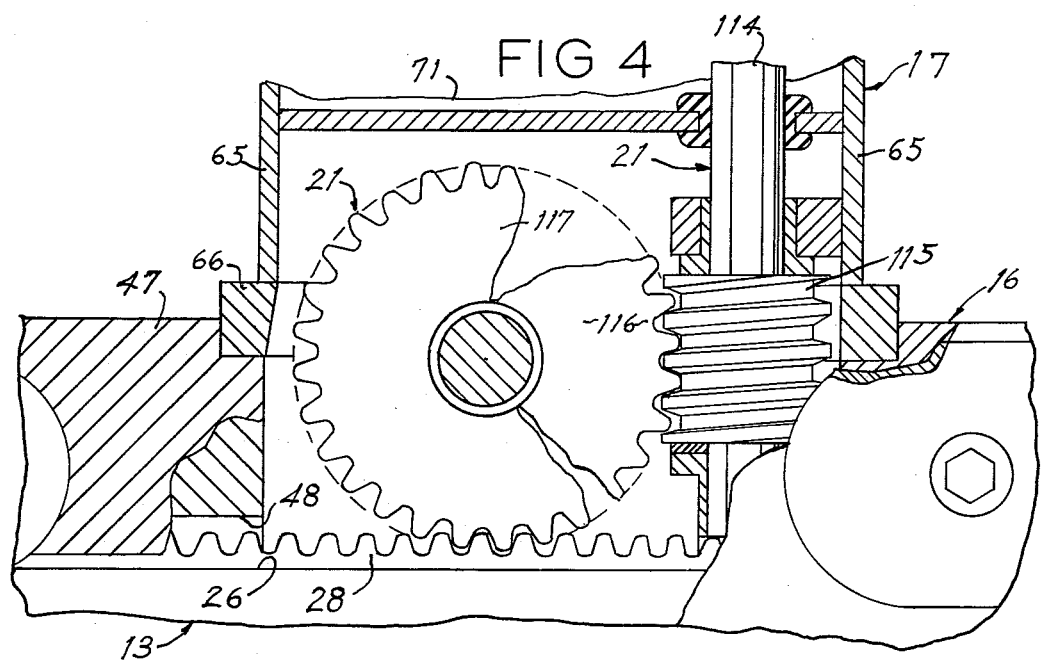
FIG. 4 is an enlarged fragmentary view of a portion of drive mechanism for the present machine.
Figure 5:
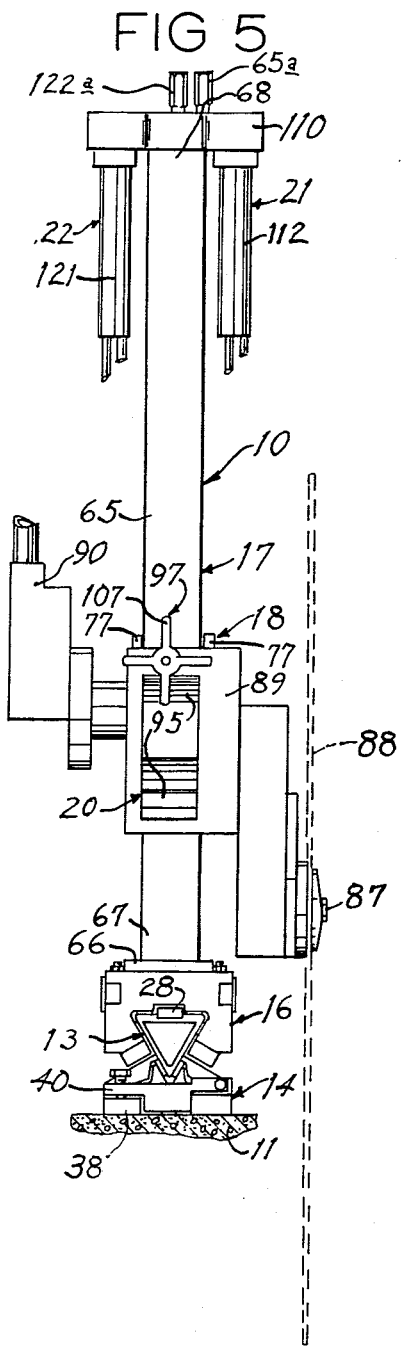
FIG. 5 is an elevational end view of the present machine.

The cutting head 19 includes an arbor 87 of standard configuration for mounting a circular saw blade 88 as shown by dashed lines in FIG. 1 and 2. The arbor shaft is connected through a gear box 89 to a motor 90. Motor 90 is shown as a hydraulic type motor. It is well understood, however, that other motors (for example electrical or pneumatic) may be as easily utilized with the present machine. In fact, various standard forms of motor and gear box assemblies may be easily adapted for use with the present machine.

The cutting head and carriage are releasably connected through the adapter means 20. Adapter means 20 is comprised as previously stated, of elements on both the carriage 18 and cutting head 19. Coupling elements 95 are provided on the cutting head 19 to interlock with complementary coupling elements 96 on carriage 18. A locking mechanism 97 is also provided to assure a secure attachment of the cutting head to carriage 18.

It should be noted that coupling elements 95 are provided on two sides of the cutting head 19 and that the coupling elements 97 are provided on opposite sides of carriage 18. These elements are specifically provided to enable mounting of the cutting head to the carriage at positions on either side (69 or 70) of standard 17. Further, the adapter elements enable mounting of the cutting head so the saw blade 88 may be positioned on either longitudinal side of the base 13.

The coupling elements 95 include a cam surface 100 and a slotted lug 101. Lug 101 includes a wedge surface 102 that is designed to operate against a lower coupling 96 on carriage 18. An upper element 96 works against the cam surface 100. The upper and lower elements 96 are integral portions of the spacer bars 78 described above. Surface 102 is wedged against the cam surface 100. The upper and lower elements 96 are integral portions of the spacer bars 78 described above. Surface 102 is wedged against one element 96 as the cam surface 100 is urged against the other elements 96.

Cutting head locking mechanisms 97 are provided on opposite sides of the carriage. Each mechanism is simply comprised of a pivoted locking bar 106 having a nut 107 threadably engaged on a free end thereof. The locking bar 106 is received within complementary slots 108 formed in the cutting head 19. When the coupling elements 95 and 96 are engaged, the appropriate locking bar 106 may be pivoted downwardly into the complementary slots 108. Nut 107 may then be tightened against the cutting head housing 19 to secure the elements 95 and 96 in position.

Movement of the truck means 16 and carriage 18 is accomplished by truck drive means 21 and carriage drive means 22. Both means 21 and 22 are mounted through the standard 17 by a drive head or gear box 110 located at the upper standard end 68.

The truck drive means 21 includes a truck drive motor 112 mounted to drive head 110. Motor 112 is connected through gearbox 110 to a drive shaft 114. Shaft 114 is enclosed within the hollow interior of standard 17 and extends from upper standard end 65, having a manual drive head 65a, to a lower shaft end fixed to a worm 115. Worm 115 is in meshing engagement with a worm gear 116. Worm gear 116, in turn, is affixed to a pinion 117. It is pinion 117 that operates in conjunction with rack 28 to drive the truck means 16 in response to operation of motor 112 backward or forward along the base 13.

It may be noted that the motor, gearbox, drive shaft, worm, worm gear, and pinion 117 are enclosed by the gearbox 110, standard 17 and truck housing 47. They are therefore shielded against the highly abrasive dust which ordinarily settles on all exposed surfaces of such cutting tools. This provision, therefore, increases the effective useful life of the truck drive mechanism.

The carriage drive mechanism 22, like truck drive mechanism 21, includes a motor 121 that is mounted to the gearbox 110 at standard end 68. Motor 121 is connected through gearbox 110 to a lead screw 122 that is rotatably journaled within the hollow portion of standard 17. A nut 123 is threadably engaged on lead screw 122. A slide bolt 124 extends outwardly from nut 123 through the longitudinal slot 72. The bolt 124 connects with one of the carriage plates 77. Since slide bolt 124 will not permit rotation of nut 123 on lead screw 122, it follows that rotation of lead screw 122 will cause longitudinal movement of the nut and thereby cause corresponding movement of carriage 18 along the standard 17. Screw 122 also has a manual drive head 122a extending from the gearbox 110 to facilitate manual operation thereof.

Again, it is noted that the entire mechanism of carriage drive means 22 is enclosed with gearbox 110 and standard 17. These components are also protected from the abrasive dust created when the machine is in operation.

Prior to mounting and operation of the present machine, a line is first drawn on the surface 11 to determine the exact position of the cut. A prescribed distance is measured off to one lateral side of the cut line to determine the position for placement of brackets 14. Once this is accomplished, the brackets 14 may be secured by drilling pilot holes into the surface and securing the anchor bolts 37 in place. Once this is accomplished, the brackets are accurately and securely positioned. The base 13 may be assembled and installed adjacent to the surface 11 by the provision of clamp plates 42 on the brackets 14.

The truck means 16, being previously engaged with one of the base sections, is therefore also secured relative to the surface 11.

Cutting head 19 may be mounted to the carriage 18 at this point by selectively engaging complementary coupling elements 95 and 96 and securing the locking bar 106 into position. This is accomplished by first engaging the lug 101 over a selected lower pin 96 then pivoting the cutting head about the point of engagement until the cam surface 100 contacts upper pin 96. Continued pivotal movement of the cutting head in this direction causes the coupling element 95 to wedge against the complementary element 96 on carriage 18.

Once the coupling elements 95 and 96 are engaged, the locking bar 106 is pivoted downwardly into the upwardly open slots 108. Nut 107 is then tightened against the cutting head to secure the carriage and cutting head against relative movement. It should be noted again that the cutting head may be positioned at any of several locations through the provision of the different mating sets of coupling elements of carriage 18 and cutting head 19.

Once the cutting head is firmly secured to the carriage 18 and it is determined that the blade 88 will move along the path defined by the line previously inscribed along the surface 11, the cutting head drive motor 90 may be actuated. After this step, the carriage drive motor 121 may also be actuated to begin moving the blade 88 toward the surface. Once the blade is positioned at a desired cutting depth within the surface 11, the carriage drive motor 121 may be deactivated. Truck drive motor 112 may be activated at this point to gradually move the truck and complementary attached cutting head along the base 13.

The cutting operation will continue as long as the drive motor 112 and cutting motor 90 are operative.

Should a second cut be desired that is angular to and joining the first cut, several steps may be taken to position the machine to perform this cut without entirely removing it from the surface 11. In order to perform this function, the truck is driven past a strategically located bracket 14 with the blade 88 disengaged from surface 11. The release bolt 41 of that bracket may be then operated to enable pivotal movement of the bracket about the axis of the anchor bolt 37. This facilitates pivotal movement of the entire base 13 about that point. When the base has been properly aligned, additional brackets 14 may be secured to the surface 11 to receive the base 13. The second cut may then be made by performing the operations as described above.

It may have become obvious from the above description and attached drawings that various changes and modifications may be made therein. Therefore, only the following claims are to be taken as definitions of this invention.

What I claim is:

1. A stone and concrete cutting machine, comprising:
   an elongated base;
   bracket means for mounting the base in a stationary position relative to a surface to be cut;
   truck means mounted to the base for longitudinal movement along the base length;
   an elongated standard protruding from the truck means in lateral relation to the base length;
   a cutting head receiving carriage mounted to the standard movement along the standard length;
   a cutting head;
   adapter means having coupling elements on the cutting head and receiving carriage for releasably mounting the cutting head to the receiving carriage on either of oppositely facing sides of the standard;
   carriage drive means interconnecting the standard and carriage for moving the carriage along the standard length; and truck drive means interconnecting the truck means and base for moving the truck along the length of the base.

2. The machine defined by claim 1 wherein the standard includes one side facing the length of the base in one direction and an opposite side facing the length of the base in an opposite direction and wherein the carriage is mounted to the standard and includes an adapter coupling element on each side of the standard.

3. The machine as defined by claim 2 wherein the cutting head includes two oppositely facing sides with an adapter element on each side, each being selectively engagable with the adaptor elements of the carriage.

4. The machine as defined by claim 1 wherein the carriage includes:
a pair of plates spaced apart with the standard therebetween;
connecting members joining the plates together;
a set of rollers mounted to the plates to rotatably engage the standard on opposite sides thereof; and
wherein the adaptor means is comprised of the connecting members and complementary lugs formed in the cutting head.

5. A stone and concrete cutting machine, comprising:
an elongated base comprised of at least one tube of triangular cross section;
bracket means for releasably mounting the base in a stationary relationship to a surface to be cut with one side of the triangular tube substantially parallel to the surface to be cut;
truck means mounted to the base for longitudinal movement along the base length with rollers thereon for engaging all three sides of the triangular tube;
biasing means for urging the roller engaging the parallel side of the triangular tubular base firmly against the parallel side to maintain the truck in self-alignment with the base;
an elongated standard protruding from the truck means in lateral relation to the base length;
a cutting head receiving carriage mounted to the standard for movement along the standard length; and
a cutting head on the receiving carriage;
carriage drive means interconnecting the standard and carriage for moving the carriage along the standard length; and
truck drive means interconnecting the truck means and base moving the truck along the length of the base.

6. The machine defined by claim 5 wherein the bracket means is adapted to be fixed by an anchor bolt to the surface to be cut and further includes bracket positioning means for selectively locating the bracket relative to the anchor bolt.

7. The machine defined by claim 5 wherein the bracket means is designed to selectively releasably grip the base along two sides thereof and at positions thereon clear of the truck means.

8. The machines defined by claim 5 wherein the base is comprised of at least one length of triangular cross-sectional tubing having a male coupling member at one end and a complementary female coupling at a remaining end to enable interconnection of several of said lengths to form a base of prescribed overall length.

9. The machine as defined by claim 5 wherein the truck drive means is comprised of a driven pinion rotatably mounted to the truck and an elongated rack extending the length of the base and fixed thereto on the one side of the tube held parallel to the surface to be cut.

10. The machine as defined by claim 5 wherein the biasing means for urging the roller engaging the one side of the triangular tubular base against the one side includes (1) a spring axle on which the roller is rotatably mounted and (2) means for deflecting the spring axle to bias the roller against the one surface.

11. A stone and concrete cutting machine, comprising:
an elongated base comprised of at least one tube of triangular cross section;
bracket means for releasably mounting the base in a stationary relationship to a surface to be cut with one side of the triangular tube substantially parallel to the surface to be cut;
truck means mounted to the base for longitudinal movement along the base with rollers thereon for engaging the triangular tube;
a standard protruding from the truck means in lateral relation to the base length;
a cutting head;
a cutting head receiving carriage mounted to the standard for movement along the standard length;
adapter means having coupling elements on the cutting head and receiving carriage for releasably mounting the cutting head to the receiving carriage on either of oppositely facing sides of the standard;
wherein the standard is hollow along its length;
a carriage drive means that operatively connects the standard and carriage from within the hollow standard for moving the carriage along the standard length; and
a truck drive means that operatively connects the truck means and base from within the hollow standard for moving the truck means along the base length.

* * * * *